(12) United States Patent
Franzen et al.

(10) Patent No.: US 8,157,492 B2
(45) Date of Patent: Apr. 17, 2012

(54) APPARATUS FOR SECURING A CONTAINER ON A PLATFORM OF A TRANSPORT VEHICLE

(75) Inventors: Hermann Franzen, Mönchengladbach (DE); Armin Wieschemann, Oberhausen (DE); Jannis Moutsokapas, Monheim (DE)

(73) Assignee: Gottwald Port Technology GmbH, Dusseldorf (DE)

( * ) Notice: Subject to any disclaimer, the term of this patent is extended or adjusted under 35 U.S.C. 154(b) by 250 days.

(21) Appl. No.: 12/673,927

(22) PCT Filed: Aug. 19, 2008

(86) PCT No.: PCT/EP2008/060838
§ 371 (c)(1),
(2), (4) Date: Feb. 17, 2010

(87) PCT Pub. No.: WO2009/024569
PCT Pub. Date: Feb. 26, 2009

(65) Prior Publication Data
US 2011/0116886 A1 May 19, 2011

(30) Foreign Application Priority Data
Aug. 23, 2007 (DE) .......................... 10 2007 039 780

(51) Int. Cl.
*B60P 7/08* (2006.01)
(52) U.S. Cl. ...................................................... 410/69
(58) Field of Classification Search .................. 410/46, 410/68, 69, 70, 80; 414/498; 248/500, 503
See application file for complete search history.

(56) References Cited

U.S. PATENT DOCUMENTS

| 472,922 A | 4/1892 | Griffith |
|---|---|---|
| 697,070 A | 4/1902 | Colborne |
| 979,898 A | 12/1910 | Steele |
| 2,043,887 A | 6/1936 | Dement |
| 2,438,571 A | 3/1948 | Maxon, Jr. |
| 2,449,863 A | 9/1948 | Ross |

(Continued)

FOREIGN PATENT DOCUMENTS

CA  1066561  11/1979

(Continued)

OTHER PUBLICATIONS

Office Action dated Aug. 5, 2011, in co-pending and commonly-assigned U.S. Appl. No. 12/443,865.

(Continued)

*Primary Examiner* — Stephen Gordon
(74) *Attorney, Agent, or Firm* — Gardner, Linn, Burkhart & Flory, LLP

(57) ABSTRACT

The invention relates to an apparatus for securing a container on a platform of a transport vehicle, in particular on a lifting platform of a floor-bound and automatically guided transport vehicle, with securing elements which are supported on the platform and bear against the container to secure same. A multiplicity of securing elements are arranged moveably on the platform in such a manner that, depending on the position and type of a container deposited on the platform, a first group of the multiplicity of securing elements is moved from the container into a passive position, and a second group of the multiplicity of securing elements is moved from the container into an operating position or remains in the operating position in which the second group of securing elements secures the container against slipping from the platform.

23 Claims, 8 Drawing Sheets

U.S. PATENT DOCUMENTS

| | | | |
|---|---|---|---|
| 2,940,767 A | 6/1960 | Quayle | |
| 2,993,703 A | 7/1961 | Paradise | |
| 3,214,136 A | 10/1965 | Marks | |
| 3,266,774 A | 8/1966 | Goyarts | |
| 3,319,932 A | 5/1967 | Szczepanik | |
| 3,497,092 A | 2/1970 | McIntyre | |
| 3,603,267 A | 9/1971 | Schwiebert | |
| 4,234,278 A | 11/1980 | Harshman et al. | |
| 4,792,272 A | 12/1988 | Oswald et al. | |
| 5,395,190 A | 3/1995 | Wurzer | |
| 5,525,019 A | 6/1996 | Moore et al. | |
| 5,785,473 A * | 7/1998 | Stark | 410/94 |
| 6,309,153 B1 | 10/2001 | Petzitillo, Jr. et al. | |
| 6,533,511 B1 | 3/2003 | deKoning | |
| 2010/0213430 A1 | 8/2010 | Franzen et al. | |

FOREIGN PATENT DOCUMENTS

| | | |
|---|---|---|
| DE | 98486 C | 6/1973 |
| DE | 4138512 A1 | 5/1993 |
| DE | 4334255 C2 | 4/1994 |
| DE | 4341484 A1 | 6/1995 |
| DE | 19606263 A1 | 9/1996 |
| EP | 0136970 B1 | 3/1987 |
| EP | 0302569 B1 | 5/1991 |
| EP | 0996562 B1 | 12/2001 |
| GB | 2172248 A | 9/1986 |

OTHER PUBLICATIONS

Translation of International Preliminary Report on Patentability—International Application No. PCT/EP2008/060838, filed Aug. 19, 2008 (5 pages), which corresponds to U.S. Appl. No. 12/673,927.

International Search Report and Written Opinion of the International Searching Authority from corresponding Patent Cooperation Treaty (PCT) Application No. PCT/EP2008/60838, mailed Dec. 18, 2008.

U.S. Appl. No. 12/443,865, filed Apr. 1, 2009, by Hermann Franzen et al.

* cited by examiner

APPARATUS FOR SECURING A CONTAINER ON A PLATFORM OF A TRANSPORT VEHICLE

CROSS REFERENCE TO RELATED APPLICATIONS

This application claims the priority benefits of International Application No. PCT/EP2008/060838, filed on Aug. 19, 2008, and also of German Application No. 10 2007 039 780.3, filed on Aug. 23, 2007, both of which are incorporated herein by reference in their entireties.

FIELD OF THE INVENTION

The invention relates to an apparatus for securing a container on a platform of a transport vehicle, in particular on a lifting platform of a floor-bound and automatically guided transport vehicle.

BACKGROUND OF THE INVENTION

It is generally known to secure ISO-containers and/or swap containers on transport vehicles by means of so-called twist locks. For this purpose, the corners of the ISO-containers and/or swap containers are provided with standardised so-called corner castings, into which a locking element of the twist lock can be introduced and rotated in order to secure the ISO-container and/or swap container on the transport vehicle. Rotation of the locking element establishes a positive-locking connection between the corner casting and the locking element. This type of twist lock is described e.g. in the German laid-open document DE 196 06 263 A1. The twist locks therein are secured to opposite ends of transverse beams of a semi-trailer. In order to prevent the twist locks from protruding in their non-operative position beyond the ends of the transverse beams in an unwieldy manner, they can be pivoted in about a vertical axis.

A further locking apparatus is also known from European Patent EP 0 996 562 B1, by means of which ISO-containers can be secured on a railway-car. This locking apparatus consists substantially of a stop element which can be pivoted open in the region of the end side of an ISO-container and which is held in a vertical position by means of an elongated knee lever. In this vertical position, the stop element lies against the end side and can thus prevent the ISO-container from sliding in its longitudinal direction on the railway-car. In order to prevent the ISO-container from lifting off from the railway car, a pin which engages into a recess in the end side of the railway-car is disposed on the end of the stop element remote from the railway-car. Moreover, the stop element can be pivoted from its vertical locking position to a horizontal non-operative position, in which it rests flatly on the loading surface of the railway-car and does not hinder a pivoting movement of a slightly raised ISO-container in the region of the railway-car. In its vertical locking position the stop element and its pin lie in the region of the corner castings of the ISO-container against the end side thereof.

Furthermore, an apparatus for fixing an object on a movable plate, in particular a freight container on a loading surface of a rail or road vehicle is known from the German Patent DE 43 34 255 C2 and comprises several securing elements which are disposed so as to be distributed on the loading surface. These securing elements can be pivoted about a horizontal axis which is directed in the longitudinal direction of the vehicle. The securing element is substantially c-shaped in formation and comprises a first eye-shaped element and a second hook-shaped element. If a container is set down on a loading surface of the vehicle, then the sleeve is pressed into the loading surface from the underside of the container. As a consequence, the entire securing element is moved about the axis thereof and therefore the hook-shaped bent part of the securing element opposite the sleeve is pivoted in the direction of a sidewall of the container. The hook-shaped part then lies against a protrusion of the container which projects laterally from the sidewall. Several of these securing elements are disposed on the longitudinal sides of the platform of the transport vehicle, in order thus to lock in a lateral manner a container which is set down on the transport vehicle.

Furthermore, a system for loading and unloading containers onto and off a ship is already known from the European patent specification EP 0 302 569 B1. This system comprises at least one quay crane for loading and unloading the container ships moored at a quay. The quay cranes are used to pick up the containers from a transport vehicle or to set the containers down on this transport vehicle. This transport vehicle is movable on the quay without the use of rails and is guided automatically by a controller. The container is unloaded by the transport vehicle or is picked up by the transport vehicle at a stationary transfer station. This transfer station consists substantially of positionally fixed support tables, onto which the containers are set down or from which the containers are picked up. These support tables are formed in the shape of support arms and support the container from below in the region of their longitudinal sides. Accordingly, the distance between the opposite support tables is designed to be smaller than the width of the containers. In order to be able to pick up the container from the support table or set it down thereon, it is provided that the transport vehicle comprises a platform for transporting the containers and either the transport vehicle overall or only its platform is raised for the purpose of transferring a container, the transport vehicle then moves, with the container now resting on its platform, out of the region of the support tables. When using a platform which can be raised and lowered, the platform still has to be lowered so that the transport vehicle can continue moving. In this case, the containers are set down on the support table in the opposite sequence. To ensure that the transport vehicle can pick up the containers from the transfer station, the lifting table has a width which is smaller than the distance between the opposite support tables. It is not described whether the container is additionally held on the platform of the transport vehicle.

SUMMARY OF THE INVENTION

The present invention provides an apparatus for securing a container on a platform of a transport vehicle, in particular on a lifting platform of a floor-bound and automatically guided transport vehicle, by means of securing elements, which apparatus is characterised by a simple and secure construction.

According to one aspect of the invention, an apparatus is provided for securing a container on a transport vehicle. The apparatus includes a lifting platform, a plurality of spindles, and a plurality of securing elements. The lifting platform has a a surface for supporting the container, and the spindles are positioned generally parallel with and below the surface of the platform, and disposed in a longitudinal direction of the platform. The securing elements are also supported on the platform, and are configured to selectively lie against the container to secure the container at the lifting platform. The securing elements are supported on respective spindles and are pivotable on the spindles between operating positions, a non-operative positions, and passive positions. The securing elements are two-armed levers each having a securing part and a weight part, and each of the securing elements is supported at its spindle at a portion of the securing element between the securing part and the weight part. A multiplicity of the securing elements are divided into first and second groups, and are moveable on the platform so that, depending upon the position and type of the container set down on the platform, the first group of the multiplicity of securing elements is moved by the container to a passive position and the second group of the multiplicity of securing elements is permitted by the container to move to an operating position (or remains in the operating position) so that the second group of securing elements secures the container to prevent it from sliding down off the platform. Further, the multiplicity of the securing elements are pivotable in the passive position by an undersurface of the container so that portions of the securing elements are substantially flush with the surface of the platform. In accordance with another aspect of the invention, in the case of an apparatus for securing a container on a platform of a transport vehicle, in particular on a lifting platform of a floor-bound and automatically guided transport vehicle, by means of securing elements which are supported on the platform and lie against the container in order to secure it, a simple and secure construction is achieved by virtue of a multiplicity of securing elements that are disposed so as to be movable on the platform such that depending upon the position and type of container set down on the platform, a first group of the multiplicity of securing elements is moved from the container to a passive position and a second group of the multiplicity of the securing elements is moved from the container to an operating position or remains in the operating position, in which the second group of securing elements secures the container to prevent it from slipping down off the platform. The multiplicity of securing elements helps ensure that the container set down on the platform is secured automatically even if the containers alternate within a known number of types and lengths. The securing elements in the passive position do not hinder the loading and unloading procedures.

In one embodiment, the securing elements are mounted on the platform so as to be able to pivot between an operating position, a non-operative position, and a passive position, and are pivoted in the passive position by an undersurface of the container, optionally terminating flush with the surface of the platform, in the direction of the platform.

A straightforward change between the individual operating positions and a reliable absorption of the securing forces may be achieved by mounting the securing elements on the platform so as to be able to pivot via spindles and the spindles are disposed in the longitudinal direction of the platform and in parallel with and below the surface of the platform.

A simple gravitational force actuation of the securing elements may be accomplished by forming the securing elements as two-armed levers having a securing part and a weight part which are mounted in the middle on the spindles. In this case, the weight parts are dimensioned in such a manner that in a non-operative position of the securing elements, in which no container is set down on the platform, the securing elements protrude with a part of its securing part from the surface of the platform in the direction of a container to be set down thereon. As a result, this dispenses with any complex mechanical or manual actuation of the securing elements.

In order to be able to hold the container on the platform, the securing elements are formed as lateral securing elements and longitudinal securing elements. In this case, the longitudinal securing elements in their operating position come to lie against an end side of a container which has slipped in the longitudinal direction of the platform, and the lateral securing elements in their operating position come to lie against an inner side of a corner casting of a container which has slipped transversely with respect to the longitudinal direction of the platform. The longitudinal securing elements may be formed in the manner of a strip having a point.

It may be advantageous, convenient and secure that the lateral securing elements are formed in the manner of a strip and comprise on their end remote from the spindle an edge which in the operating position of the lateral securing elements protrudes laterally to a slight extent from the platform and at the height of the surface of the platform. The edge can transfer the holding forces between the corner casting and the platform in a reliable manner.

In another embodiment, it is provided that, as seen in the direction of the spindle, the securing part has a parallelogram-like shape whose longitudinal side facing the container to be set down and the end side remote from the spindle taper towards one another in an obtuse-angled manner and form the edge.

It may further be provided that the lateral securing elements are distributed in several groups on the platform such that containers of various sizes can be secured in each case in the region of their corner castings. The containers are further secured in this manner on the stable corner castings but outside the otherwise used, standardised openings in the corner castings.

Safety may be increased by disposing the lateral securing elements on the platform in a redundant manner as a pair in relation to a corner casting to be secured.

The apparatus provided for securing purposes may be used in a multi-purpose manner by distributing the longitudinal securing elements in several groups on the platform such that containers of various sizes can be secured in each case in the region of their end sides.

It is adequate that rigid end securing elements instead of longitudinal securing elements are disposed in the region of the end surface of the platform.

In the event that the platform is divided in its longitudinal direction into two platforms, the securing elements may be disposed in a mirror-inverted manner with respect to each other on the respective platforms.

The previously described lateral securing elements may be particularly suitable if the width of the platform is smaller than the width of the container. Then, the corner castings having their standardised openings cannot be used for securing purposes.

These and other objects, advantages, and features of this invention will become apparent upon review of the following specification in conjunction with the drawings.

DESCRIPTION OF THE PREFERRED EMBODIMENTS

Figure 1:
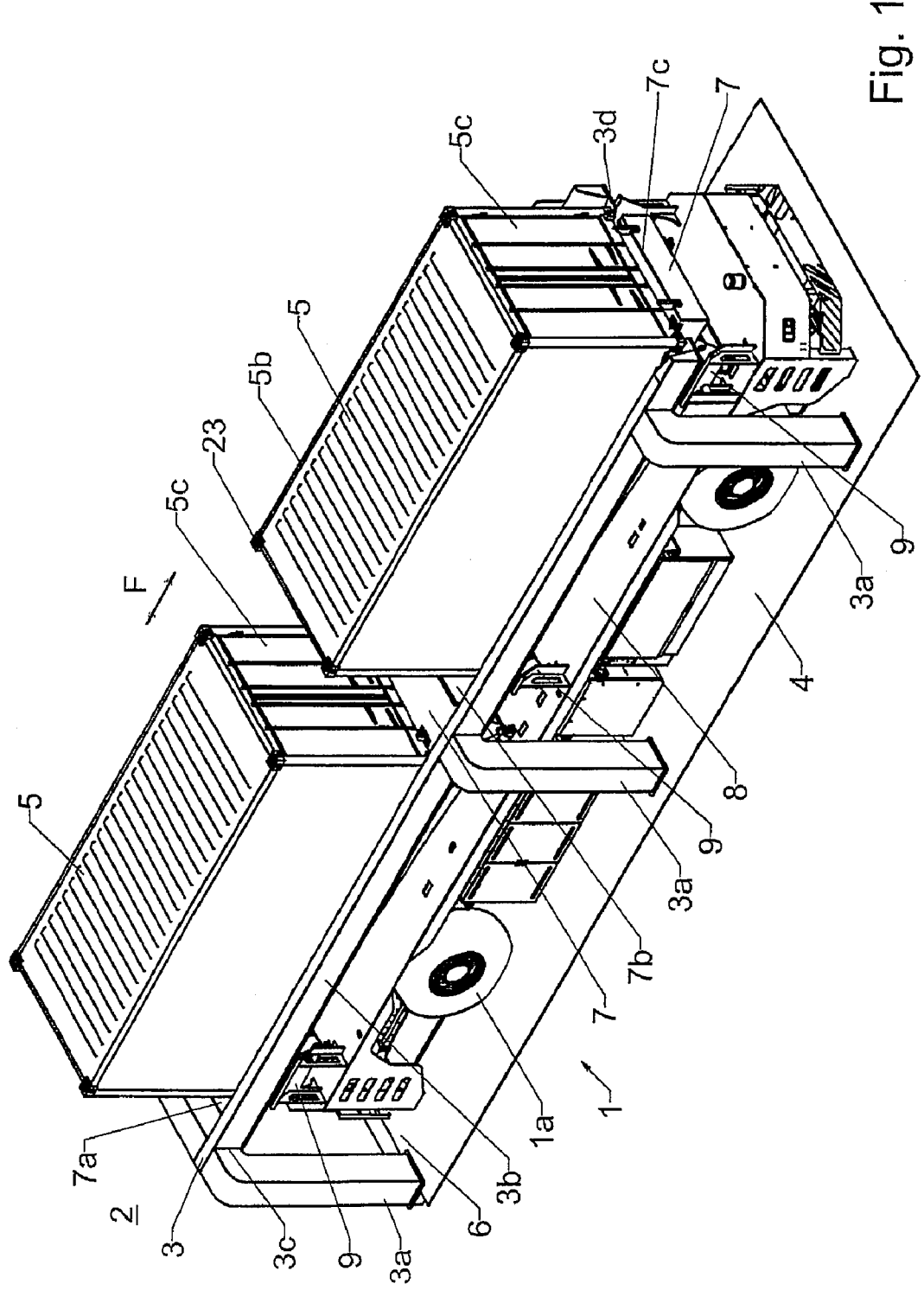
FIG. 1 is a perspective view of an automatically guided vehicle in a transfer station.

FIG. 1 illustrates a perspective view of an automatically guided vehicle 1 within a transfer station 2. A transfer station 2 of this type can serve as an interface between the automatically guided vehicles 1 and another transport means such as, for example, a gantry crane having a spreader frame as a load receiving member or a high-legged and manned container-transport vehicle which is known in the art as a "straddle carrier."

Figure 2:
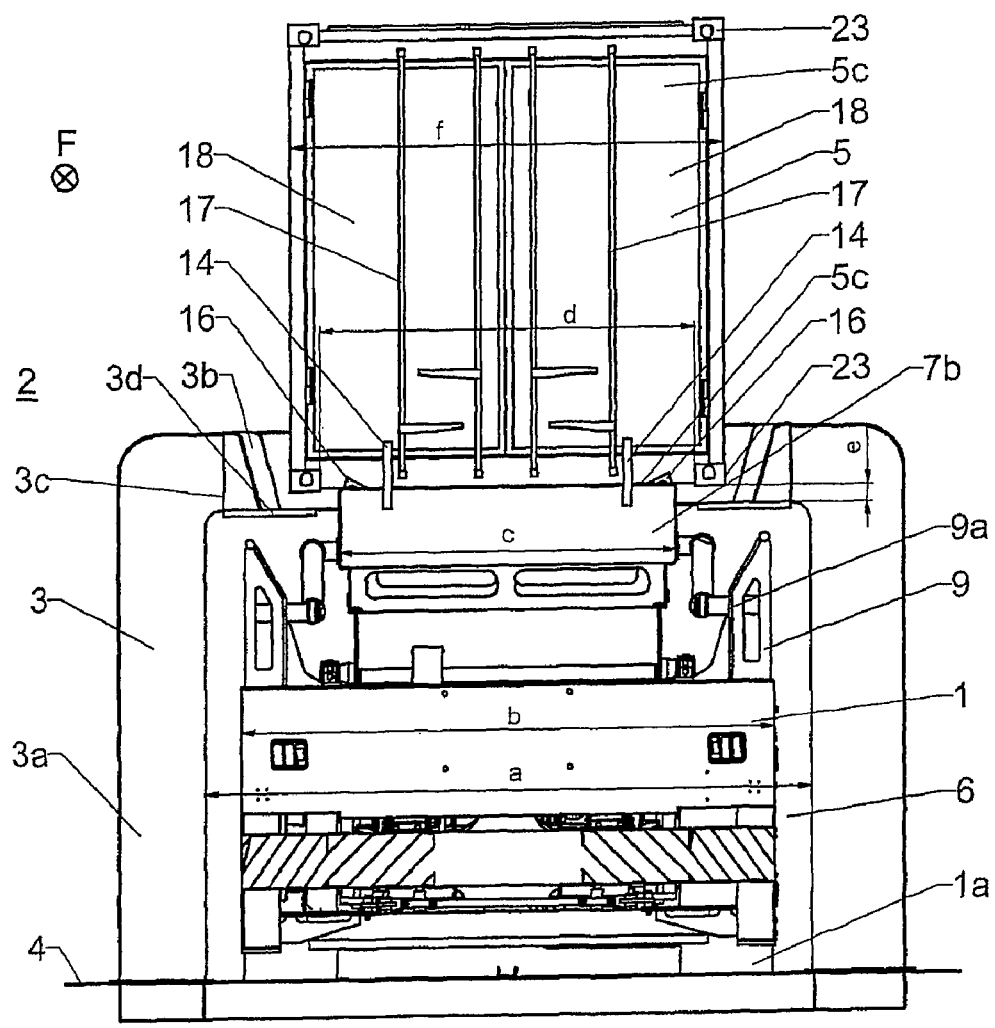
FIG. 2 is a front elevation view of the vehicle and transfer station of FIG. 1, in which the lifting table of the vehicle is raised.

The transfer station 2 includes a stationary support frame 3 having legs 3a in the form of vertical posts and support rails 3b secured thereto. The legs 3a are positioned at their lower end on a floor 4 which typically forms part of a quay in ports. At their end remote from the floor 4, the legs 3a are slightly bent inwards, so that they appear slightly L-shaped as seen in the direction of travel F of the vehicle. Then, the support rail 3b is secured to the thus substantially vertically extending, upper end surface 3c of the legs 3a. A total of six legs 3a are provided, of which in each case on the right-hand and left-hand side as seen in the direction of travel F three legs are each disposed at a spaced interval with respect to each other and with respect to the vehicle 1 which has pulled into the transfer station 2. The right and left legs 3a are also disposed opposite one another. The spaced interval a between two oppositely disposed legs 3a is selected to be greater than the width b of the vehicle 1 so as to allow the vehicle 1 to pull in (FIG. 2). In this case, the spaced interval a is about 100 mm larger than the width b. The opposite support rails 3b which are secured in each case to the end surfaces 3c of the legs 3a have an L-shaped cross-section as seen in the direction of travel F, wherein their long limb is secured to the end surfaces 3c of the legs 3a and the short limb forms a horizontal and inwardly facing support surface 3d for the container 5 to be set down thereon. The containers 5 are positioned, with their corner castings 23 which are stable and may be disposed in the lower corners and with their lower longitudinal sides 5b lying therebetween, on the support surfaces 3d of the support rail 3b when they have been set down at this location by the vehicle 1 or by another transport means.

In order to set the containers 5 down on the support surfaces 3d or in order to pick up the containers 5 from the support surfaces 3d, the vehicle 1 comprises a lifting table 7 which can be raised and lowered vertically relative to a vehicle frame 8 of the vehicle 1. The lifting height of the lifting table 7 may be, for example, about 600 mm. It is apparent in FIG. 1 that a first lifting table 7a and a second lifting table 7b are disposed on the vehicle frame 8 one behind the other as seen in the direction of travel F of the vehicle 1. The length of an individual lifting table 7a, 7b may be selected in such a manner that a 20-foot container 5 can be transported thereon. The first lifting table 7a and the second lifting table 7b also may complement one another in the event that they are raised and lowered in a synchronous manner, to form a large lifting table on which 40-foot containers and even 45-foot containers can be transported.

In FIG. 1, the vehicle 1 has just pulled into the transfer station 2. This is typically performed in the automatic mode, so that the entry channel 6 having the width a between the opposite legs 3a of the support frame 3 must also only be slightly larger than the width b of the vehicle 1. Before the vehicle 1 pulls into the transfer station 2, the vehicle 2 has been stopped briefly in order to raise the first lifting table 7a and the second lifting table 7b with the respective containers 5 in each case from their lower transport position to their upper lifting position. In this lifting position the lifting surfaces 7c of the respective lifting tables 7a, 7b, on which the containers 5 are positioned, protrude beyond the vertically inwardly extending support surfaces 3d of the support rails 3b. As seen in the direction of travel F, the lifting tables 7a, 7b have a smaller width c than the spaced interval d between the support surfaces 3d of the opposite legs 3a of the support frame 3 (FIG. 2). Therefore, with the lifting tables 7a, 7b raised in the lifting position the vehicle 1 can pull into the transfer station 2, without the lifting table 7a, 7b coming into contact with the support rails 3b. The lifting surfaces 7c of the lifting tables 7a, 7b are also located above the support surfaces 3d, so that as the vehicle 1 pulls into the transfer station 2 the undersurfaces 5a of the containers 5, in particular their fastening elements 23, is/are located above the support surfaces 3d. If the vehicle 1 has pulled into the transfer station 2 to the required depth, the lifting tables 7a, 7b are lowered to their transport position and the containers 5 are set down with their corners 23 and their longitudinal sides 5b on the support surfaces 3d of the support rail 3b. The vehicle 1 can then leave the transfer station 2 with its lowered lifting tables 7a, 7b whilst leaving the containers 5 behind on the support frame 3.

In order make it easier to set the containers 5 down onto the first lifting table 7a and the second lifting table 7b, which for this purpose are each located in their lower transport position, hopper-like guide elements 9 are provided on the vehicle frame 8 of the vehicle 1 on the right-hand and left-hand side as seen in the direction of travel F of the vehicle 1 next to the lifting tables 7a, 7b in each case in their initial and end regions. These guide elements 9 have a guide surface 9a (FIG. 2) which is directed inwardly with respect to the lifting tables 7a, 7b and which widens in an upwards direction starting from the vehicle frame 8 and thus aligns a container 5 laterally in the direction of the lifting table 7a, 7b as it is being lowered onto the lifting tables 7a, 7b.

It is also apparent in FIG. 1 that the vehicle 1 is not a rail vehicle but rather is a vehicle 1 having tires 1a.

FIG. 2 illustrates a front view of FIG. 1 in the direction of travel F of the vehicle 1 in the transfer station 2. The container 5 illustrated in this FIG. 3 and the second lifting table 7b are located in the raised lifting position, as also shown in FIG. 1. It is apparent that the corner castings 23 of the container 5 are located at a spaced interval e above the support surfaces 3d of the support rails 3b. This spaced interval e can vary, for example, between 50 and 150 mm depending upon the loading state of the container 5 and the inflation pressure of the tires 1a.

Figure 3:
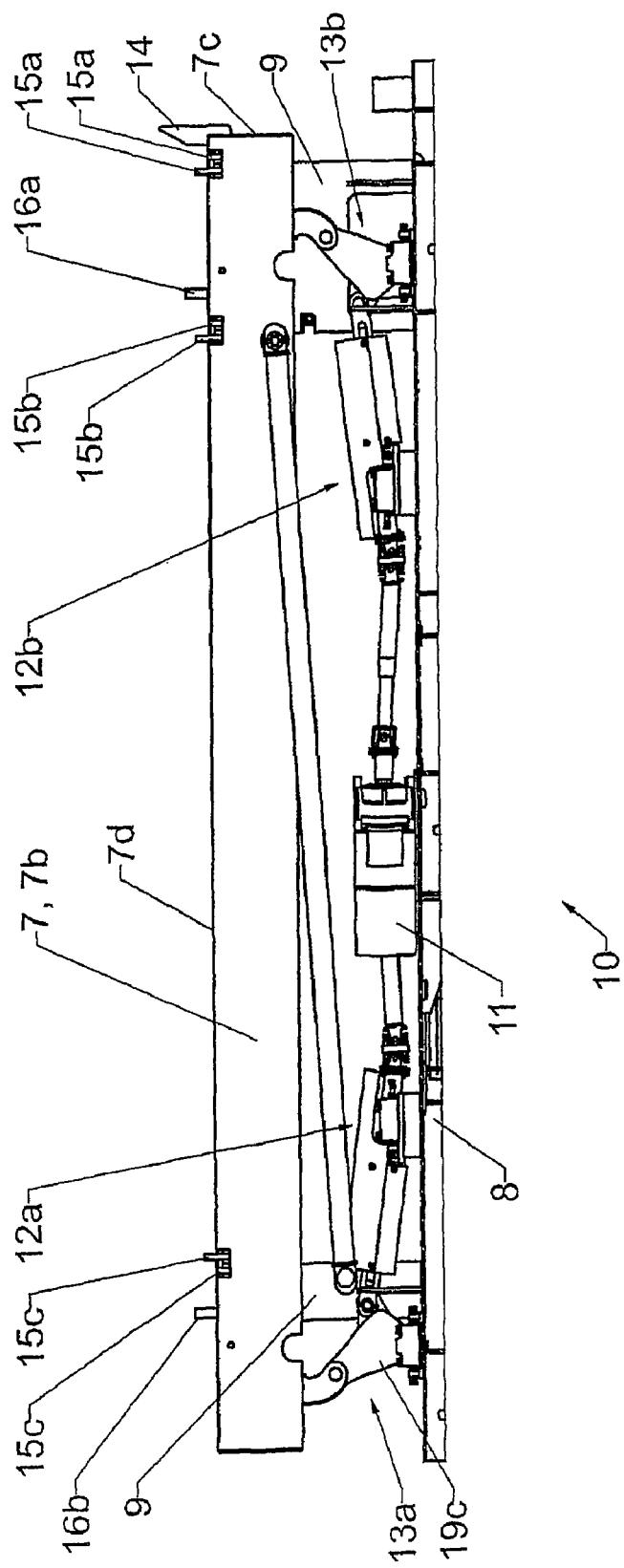
FIG. 3 is a side elevation view of a lifting table in the raised position.
Figure 4:
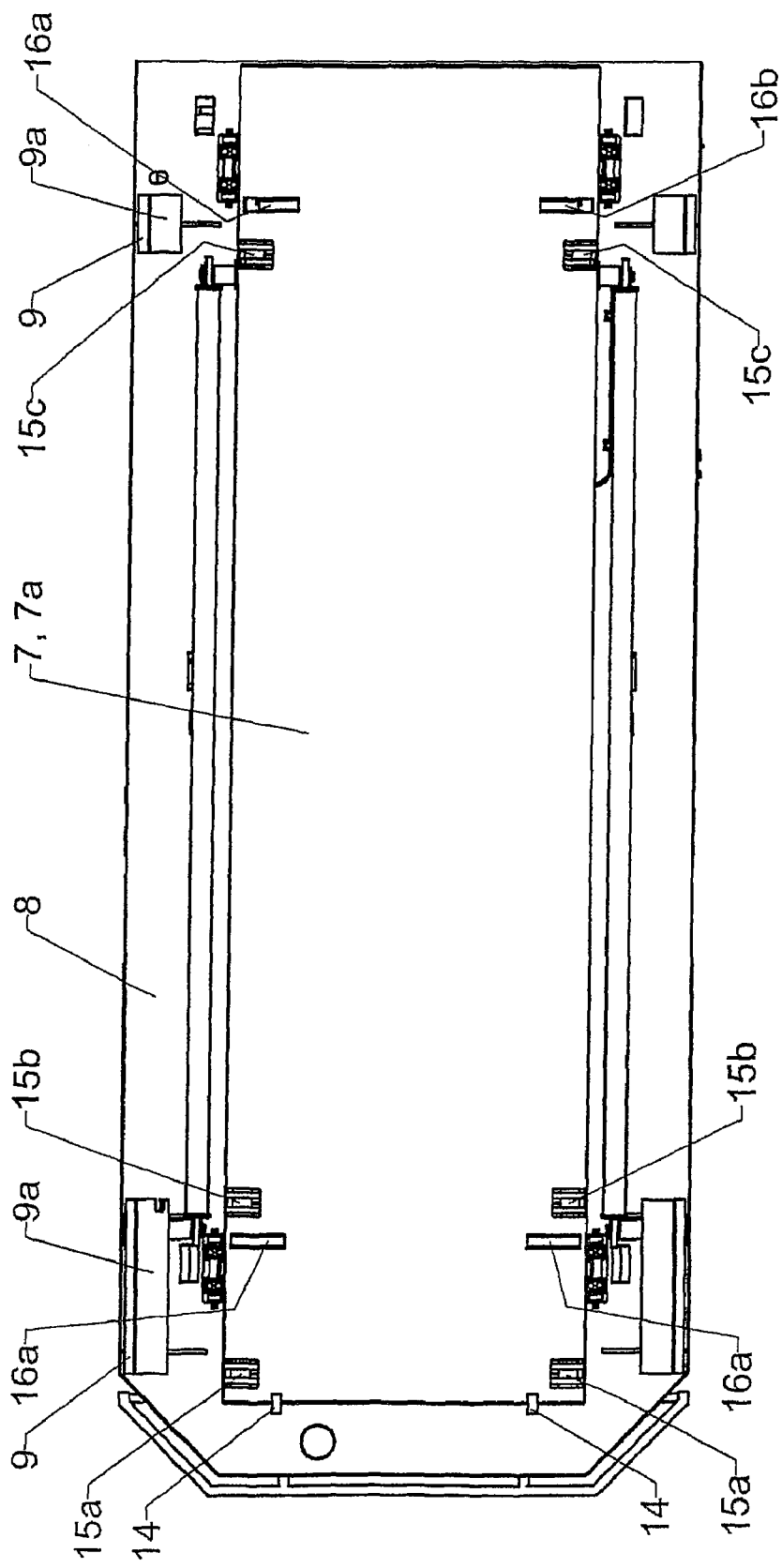
FIG. 4 is a top plan view of a lifting table of a vehicle as shown in FIG. 1.

It is also readily apparent that the container 5 has a width f which on both sides protrudes beyond the lifting table 7, 7b with its width c. In order to be able to secure the container 5 in the raised lifting position in a reliable manner on the lifting table 7, 7b so as to prevent it from slipping, various groups of securing elements 14, 15a, 15b, 15c and 16a, 16b are disposed on the lifting tables 7, 7b (FIGS. 2-4). In particular, they are end securing elements 14, lateral securing elements 15a, 15b, 15c and longitudinal securing elements 16a, 16b, of which the lateral securing elements 15a, 15b, 15c detain the container 5 in the event of it slipping laterally on the lifting table 7, 7a, 7b and the end securing elements 14 and the longitudinal securing elements 16a, 16b prevent the container 5 from slipping in the direction of travel F of the vehicle 1 and thus in the longitudinal direction of the container 5 on the lifting table 7, 7a, 7b.

FIG. 2 illustrates two end securing elements 14 and two longitudinal securing elements 16a, 16b. In this case, longitudinal securing elements 16a, 16b protrude from the lifting table 7 upwards and lie against one of the two end sides 5c of the container 5 in the region of its lower edge. The end securing elements 14 are disposed on one of the two end surfaces, and in fact on the outer end surface 7c, of the lifting table 7c and are not in contact with the container 5. The lateral securing elements 15a, 15b, 15c are not illustrated in FIG. 2.

FIG. 3 illustrates a side view of the second lifting table 7b and of the adjoining vehicle frame 8. The lifting table 7b is located in its raised position. The lifting table 7b is lifted and lowered by a lifting drive 10 which includes a drive 11, two adjusting spindle drives 12a, 12b and two knee levers 13a, 13b. In essence, it is also possible to use other types of lifting drives such as e.g. hydraulic lifting drives.

It is also apparent in FIG. 3 that the end securing elements 14, lateral securing elements 15a, 15b, 15c and longitudinal securing elements 16a, 16b are disposed in such a manner as to be distributed on the surface 7d of the lifting table 7b, in order to be able to secure the various lengths of container 5 such as 20 foot, 40 foot and 45 foot. Disposed on the outer end surface 7c of the lifting table 7b are two end securing elements 14 (FIGS. 3 and 4) which are rigidly connected to the end surface 7c and extend from the surface 7d of the lifting table 7b. As seen transverse to the longitudinal extension, the end securing elements 14 are disposed so as to be spaced apart from one another and offset with respect to the sides of the lifting table 7b (see FIGS. 2 and 4). In this case, the arrangement of the end securing elements 14 is selected in such a manner that the locking elements 17 provided on the container 5 for the doors 18 of the container 5 do not come to lie against the end securing elements 14. Furthermore, the end securing elements 14 are formed so as to be widened upwards with regard to a container 5 which is to be set down onto the lifting table 7b. Overall, the end securing elements 14 are formed as strip-shaped profile bars which are welded rigidly to the lifting table 7b. The end sides of 20-foot containers 5 and those of 45-foot containers may come to lie against the rigid end securing elements 14.

FIG. 3 also illustrates longitudinal securing elements 16a, 16b at two different locations as seen in the longitudinal direction of the lifting table 7b. The longitudinal securing elements 16a, 16b are each located in the vicinity of the front and rear end surface 7c of the lifting table 7b and in the non-operative position and also the operating position protrude from the surface 7d of the second lifting table 7b. The longitudinal securing elements 16a, which are at the front as seen in the longitudinal direction of the lifting table 7b and starting from the end securing elements 14, serve to secure a 40-foot container 5 and the longitudinal securing elements 16b, which are at the rear as seen in the longitudinal direction of the lifting table 7b, and starting from the end securing elements 14, serve to secure a 20-foot container 5. The other end of the 20-foot container 5 is secured by the end securing elements 14. In order to secure the other end of the 40-foot container 5, corresponding longitudinal securing elements 16a are disposed on the first lifting table 7a in a minor-inverted manner.

Furthermore, FIG. 3 illustrates three groups of lateral securing elements 15a, 15b, 15c, of which each group comprises a pair of redundant lateral securing elements 15a, 15b, 15c. In their non-operative position, i.e. when no container 5 is set down on the lifting table 7, the lateral securing elements 15a, 15c, 15c protrude upwards partially from the surface 7d of the lifting table 7. Starting from the end securing elements 14 and in the longitudinal direction of the lifting table 7, a pair of front lateral securing elements 15a, a pair of central lateral securing elements 15bc and a pair of rear lateral securing elements 15c are disposed on the second lifting table 7b. In the operating position, i.e. when a container 5 is set down on the lifting table 7, the lateral securing elements 15a, 15b, 15c provide the function of a defined stop surface for the corner castings 23a of the containers 5. Should a container 5 slip laterally on the raised container 5, the corner casting 23 of the container 5 comes against the lateral securing element 15a, 15b, 15c and thus prevents any further slippage. Therefore, in a corresponding manner the front lateral securing elements 15a, the central lateral securing elements 15b and the rear lateral securing elements 15c are disposed on the second lifting table 7b, as seen in the longitudinal direction of the lifting table 7b, in each case laterally adjacent and inwardly offset with respect to the corner castings 23 of the containers 5 which are to be transported and which can be, for example, 20, 40 and 45 feet in length. In the illustrated embodiment, the front lateral securing elements 15a serve to secure the corner castings 23 of a 45-foot container or a 20-foot container, the central lateral securing elements 15c serve to secure the corner castings 23 of a 40-foot container, and the rear lateral securing elements 15c serve to secure the corner castings 5a of a 20-foot container. The opposite corner castings 23 of the 45-foot containers or of the 40-foot containers are secured by the front lateral securing elements 15a and central lateral securing elements 15b which are disposed in a minor-inverted manner on the first lifting table 7a.

FIG. 3 illustrates the second lifting table 7b. It will be appreciated that the first lifting table 7a is constructed in an identical but laterally reversed manner, so that the end securing elements 14 for the 45-foot container 5 are located the furthest distance apart.

The aforementioned laterally reversed construction is also clearly illustrated in FIG. 4 which illustrates a plan view of the first lifting table 7a. In this case, the outer end securing elements 14 are to be found accordingly on the outer lateral surface 7e of the first lifting table 7a and in the left-hand region in FIG. 4. In relation to the front lateral securing elements 15a, the central lateral securing elements 15b and the rear lateral securing elements 15c, it can be seen that they are each disposed adjacent to the lateral surface 7e of the first lifting table 7a, in order to be in the operating state in the vicinity of the corner castings 23 of the container 5.

Figure 5:
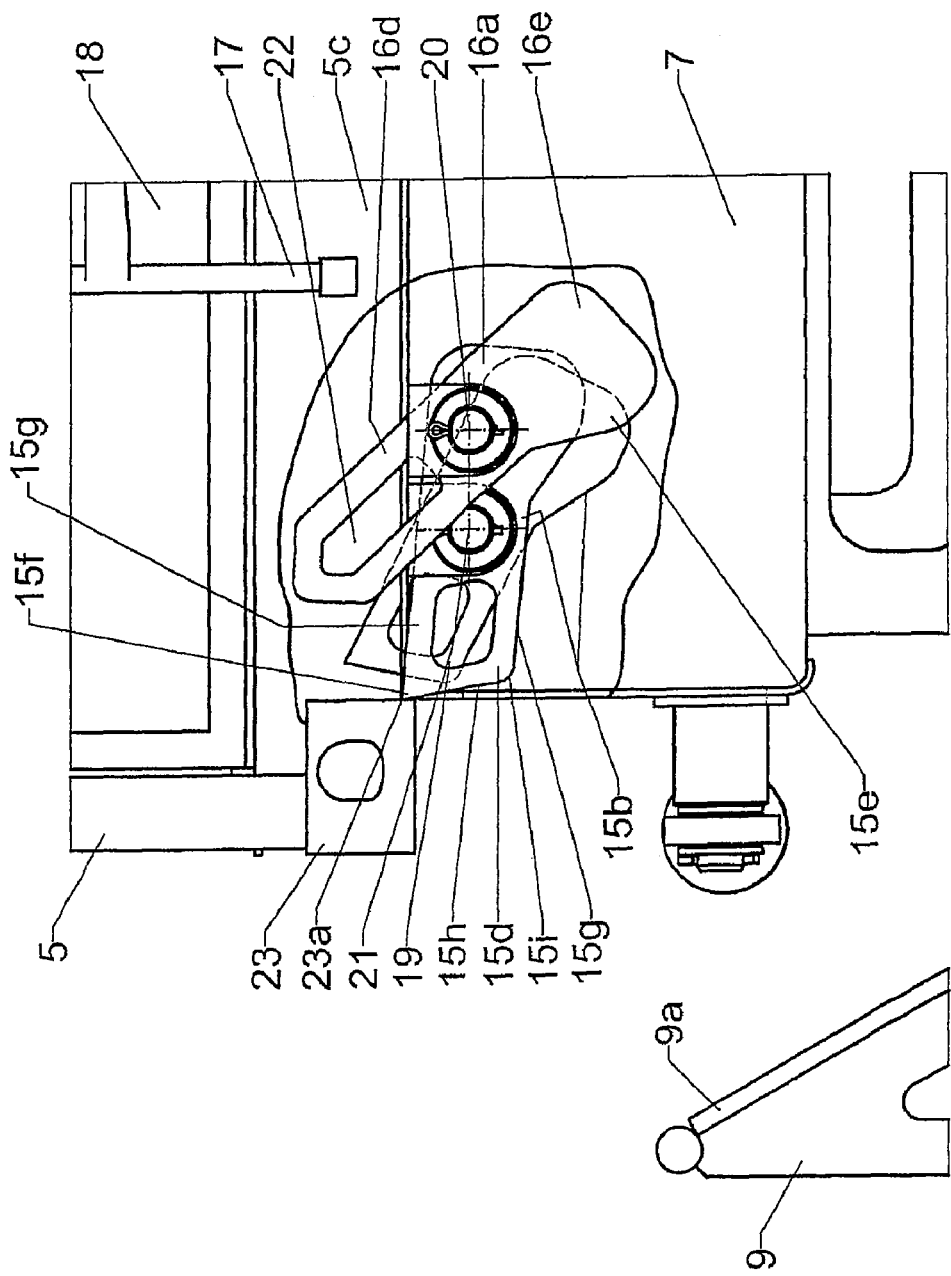
FIG. 5 is a section enlargement of FIG. 2 from the region of a lifting table and a container.

FIG. 5 illustrates a section enlargement illustration of FIG. 2 from the region of the lifting table 7b and of the container 5 set down thereon, wherein the container 5 includes a securing central lateral securing element 15b and a securing front longitudinal securing element 16a as shown. All of the lateral securing elements 15a, 15b and 15c and longitudinal securing elements 16a, 16b are formed as two-armed levers consisting of a sheet steel strip with a securing part 15d, 16d and a weight part 15e, 16e. Approximately in the center, each lateral securing element 15a, 15b and 15c and longitudinal securing element 16a, 16b is mounted so as to be able to pivot about a spindle 19, 20. In this case, the spindles 19, 20 are aligned in parallel with the surface 7d and in the longitudinal direction of the first lifting table 7a and are disposed below the surface 7d of the first lifting table 7a. The securing parts 15d, 16d have a central opening 21, 22 in order to make them lighter than the weight part 15e, 16e. Moreover, the flat securing part 15d of the lateral securing element 15a, 15b, 15c is tapered.

The longitudinal securing elements 16a, 16b are balanced in such a manner that in the non-operative position, i.e. when no container 5 is set down on the lifting table 7, and in the operating position, i.e. when a container 5 is set down on the lifting table 7 with its end surface 7c adjacent to the longitudinal securing elements 16a, 16b, the securing part 16d protrudes from the surface 7d of the lifting table 7b approximately at an angle of 45 degrees. The angle of 45 degrees has been selected so that the securing part protrudes with an adequate length from the surface 7d of the first lifting table 7a, in order to secure the container 5 on its end surface 7c to prevent it from slipping. Moreover, the longitudinal securing elements 16a, 16b can be located in a third position and furthermore in a passive position, i.e. when a container 5 stands on the longitudinal securing elements 16a and pivots it against the gravitational force of the weight part 16e into the lifting table 7a (see FIG. 8).

It is also possible that in the operating position the longitudinal securing elements 16a, 16b are urged by the locking elements 17 slightly in the direction of the surface 7d of the lifting table 7 but continue to protrude from the surface 7d of the lifting table 7 to an adequate extent such as at an angle of 30 degrees.

The lateral securing elements 15a, 15b and 15c are balanced differently than the longitudinal securing elements 16a, 16b, so that in the non-operative position they protrude from the surface 7d of the lifting table 7b at an angle of 30 degrees. In the operating position, the lateral securing elements 15a, 15b and 15c are pivoted by the undersurface 5a of the container 5 downwards to the surface 7d of the lifting table 7. In the operating position, the longitudinal axis of the securing part 15e is disposed at an angle of about 5 degrees with respect to the surface 7d of the lifting table 7. The securing part 15e is formed in such a manner that it has an edge 15f which extends in the longitudinal direction of the lifting table 7 and in parallel with the spindle 19 and extends over the entire width of the securing part 15e. The edge 15f is disposed on the end of the securing part 15e remote from the spindle 19. As seen in the longitudinal direction of the lifting table 7, the securing part 15e has a parallelogram-like shape. Therefore, it has two mutually parallel longitudinal sides 15g which at the end remote from the spindle 19 are connected to each other by means of an end side 15h. In the region of the acute-angled edge 15f, the angle between the longitudinal side 15 and the end side 15 is about 75 degrees. In a corresponding manner, the angle between the longitudinal side 15g and the end side 15h is about 105 degrees in relation to the rounded corner 15i.

FIG. 5 does not illustrate the container 5 in its normal transport position but rather in a position which has slipped laterally in the direction of the lifting table 7, in order to explain in more detail the function of the lateral securing elements 15a, 15b, 15c. In the operating position, the lateral securing elements 15a, 15b, 15c protrude with their edges 15f slightly from the lifting table 7, as their longitudinal edge 7f is rounded and the edges 15f are acute-angled. A container 5 which slips laterally on the lifting table 7 comes to lie with its inner surface 23a of the cubical corner casting 23 against the edge 15f of the lateral securing element 15a, 15b, 15c and is thus detained. The inner surface 23a is produced by virtue of the fact that the corner casting 23 protrudes slightly from the underside 5a of the container 5.

It is also advantageous that the lateral securing elements 15a, 15b, 15c are pivotally mounted on the lifting table 7 and therefore the contact of the inner surface 23a with the edge 15f of the lateral securing elements 15a, 15b, 15c is set according to the positioning of the lateral securing elements 15a, 15b, 15c and thus is an improvement in the manner in which the edge 15f lies against the inner surface 23a.

It is also apparent in FIG. 5 that the lateral securing elements 15a, 15b, 15c are each disposed in a redundant manner as pairs on a common spindle 19. To illustrate this, the rear lateral securing elements 15a, 15b, 15c are illustrated in their non-operative positions. This position can be assumed by the second lateral securing element 15a, 15b, 15c of a pair, if the undersurface 5a of the container 5 comprises beads or transverse recesses, not illustrated, and is thus not urged downwards in the direction of the surface 7d of the lifting table 7. The securing function is retained, as the securing part 15e also comes to lie against the inner side 23a of the corner casting 23, wherein the corner casting 23 of the container 5 slides easily onto the rounded edge of the lifting table 7.

Figure 6:
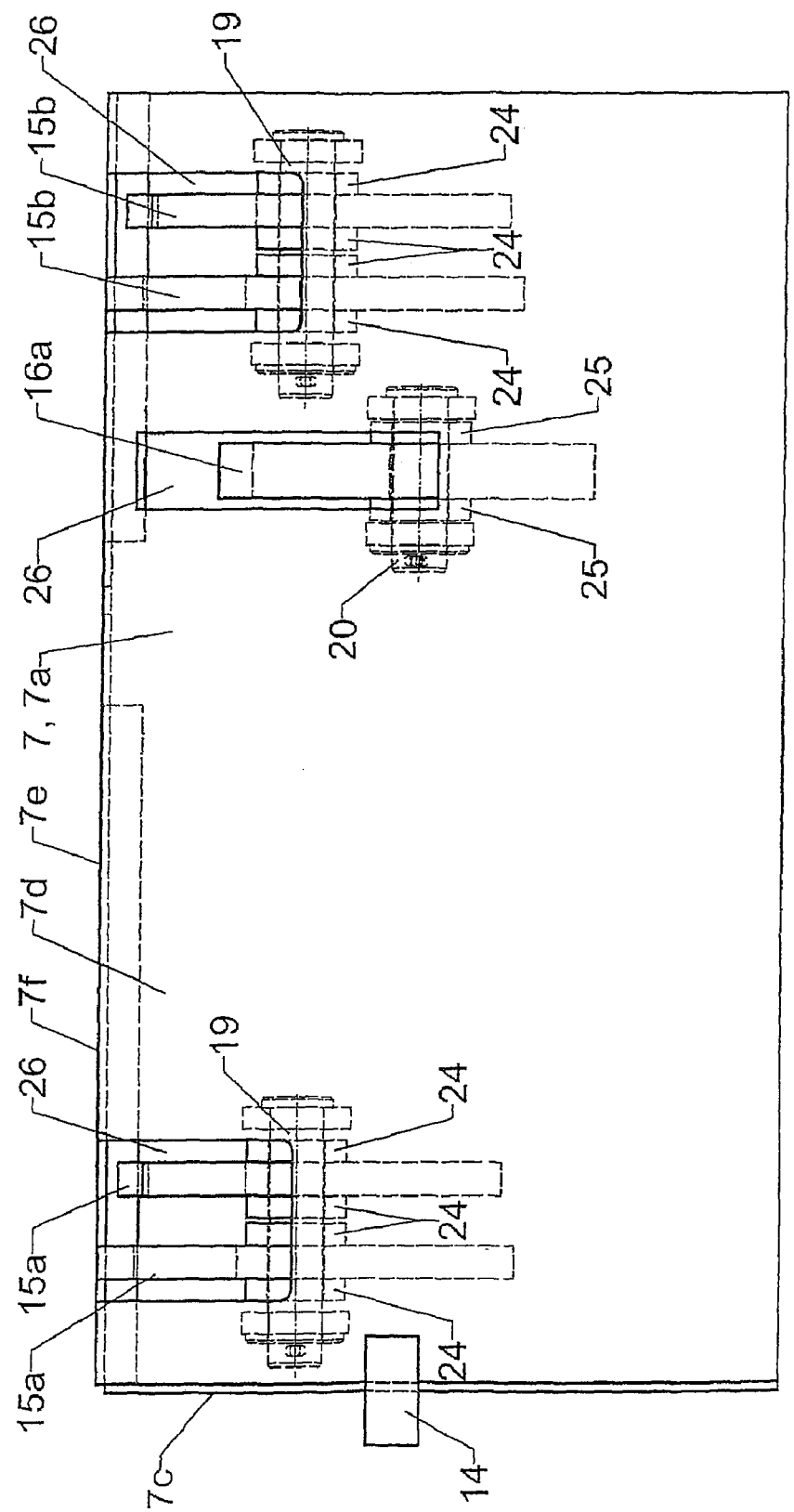
FIG. 6 is a section enlargement of FIG. 5 from the region of a corner of a lifting table.

FIG. 6 illustrates an enlargement of the left-hand upper corner of the lifting table 7 as shown in FIG. 5. It is apparent that as seen in the longitudinal direction of the lifting table 7 the pairs of lateral securing elements 15a, 15b are mounted in such a manner as to be able to pivot on a common spindle 19 and are mounted one behind the other and at a small spaced interval with respect to each other. As in FIG. 5, the respective first one of the two lateral securing elements 15a, 15b, which is disposed in each case in closer proximity to the end securing element 14, is illustrated in the operating position and the second one is illustrated in the non-operative position. Therefore, the second lateral securing element 15a, 15b appears to be shorter than the first, although both are formed in an identical manner. It is also apparent that the end securing element 14 and the longitudinal securing element 16 are located in a similar position relative to the associated lateral securing elements 15a, 15b.

FIG. 6 also shows that the spindles 19, 20 for mounting the lateral securing elements 15a, 15b, 15c and the longitudinal securing elements 16a, 16b are secured by plates 23, 24 to the underside of the surface 7d of the lifting table 7. It can also be seen that disposed in the surface 7d of the lifting table 7 are rectangular openings 26, by means of which the lateral securing elements 15a, 15b, 15c and the longitudinal securing elements 16a, 16b protrude from the surface 7d of the lifting table 7 or are received therein.

Figure 7:
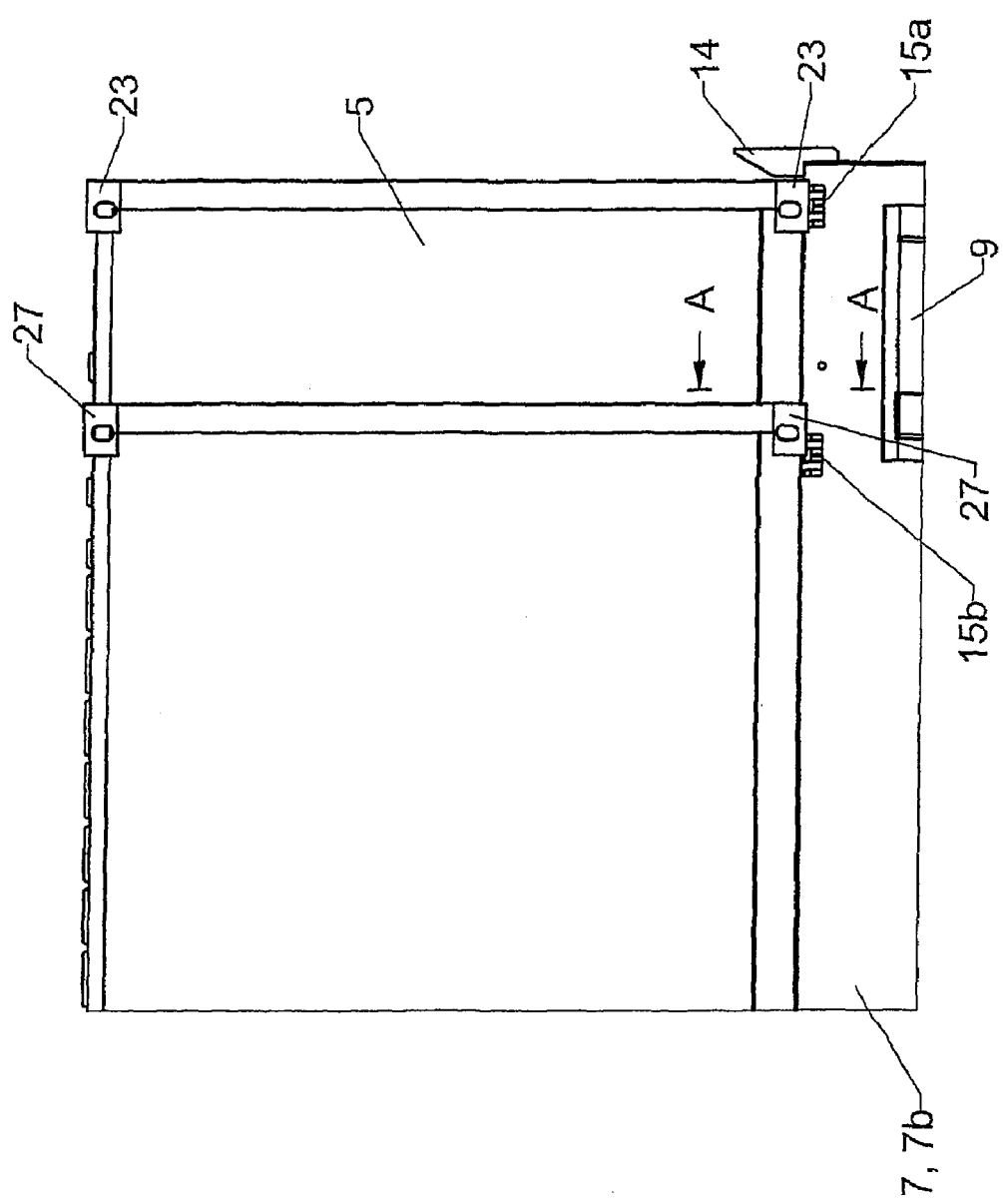
FIG. 7 is a side view of an end region of a 45-foot container on a lifting table.

FIG. 7 illustrates a side view of an end region of a 45-foot container 5 on the lifting table 7. The 45-foot container 5 typically has corner castings 23 and additional corner castings 27 in the region of the length of a 40-foot container 5. The central lateral securing elements 15b and front longitudinal securing elements 16a, 16b are urged downwards by the corner castings 27 of the 45-foot container 5 or the adjoining undersurface 5a and thus do not hinder the pick-up and transportation of the container 5. In addition to the front lateral securing elements 15a, one of the two central lateral securing elements 15b is located in a position, in the event of the container 5 slipping, to secure the container by abutment against the inner surface 27a of the corner casting 27.

Figure 8:
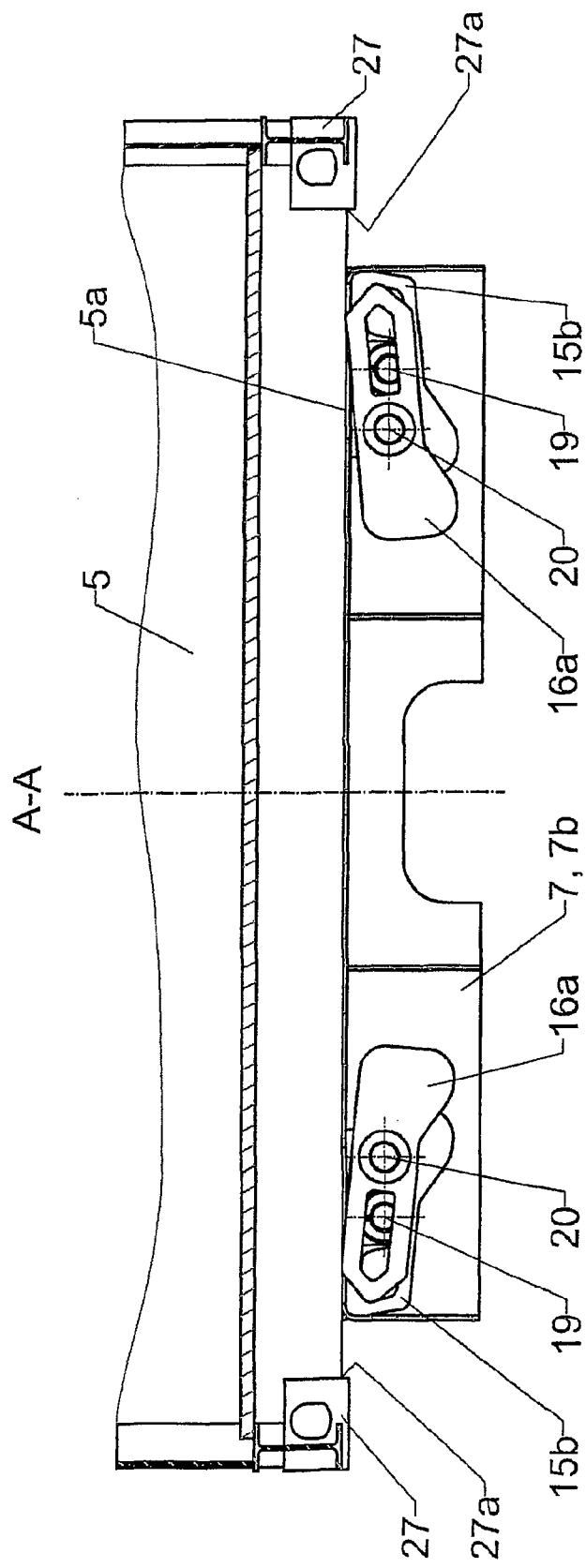
FIG. 8 is a sectional view of FIG. 7 along the sectional line A-A.

FIG. 8 illustrates a sectional view of FIG. 7 along the sectional line A-A. This Figure illustrates clearly that the central lateral securing elements 15b and the front longitudinal securing elements 16a are pivoted downwards by the undersurface 5a of the container 5.

In terms of the invention, the term "container 5" refers to ISO-containers and/or swap containers. It will be appreciated that in the present invention, it is also advantageous that the lateral securing elements 15a, 15b, 15c and the longitudinal securing elements 16a, 16b are not to be driven but rather are moved merely by the respective weight 15e and 16e or the container 5 set down thereon.

Changes and modifications in the specifically described embodiments may be carried out without departing from the principles of the present invention, which is intended to be limited only by the scope of the appended claims, as interpreted according to the principles of patent law including the doctrine of equivalents.

LIST OF REFERENCE NUMERALS 1 automatically guided vehicle
1a tires
2 transfer station
3 support frame
3a legs
3b support rail
3c end surface
3d support surface
4 floor
5 container
5a undersurface
5b longitudinal side
5b end side
6 entry channel
7 lifting table
7a first lifting table
7b second lifting table
7c end surface
7d surface
7e lateral surface
7f longitudinal edge
8 vehicle frame
9 guide element
9a guide surface
10 lifting drive
11 drive motor
12a, 12b adjusting spindle drive
13a, 13b knee lever
14 end securing elements
15a front lateral securing elements
15c central lateral securing elements
15c rear lateral securing elements
15d securing part
15e weight part
15f edge
15g longitudinal side
15h end side
15i corner
16a front longitudinal securing elements
16b rear longitudinal securing elements
16d securing part
16e weight part
17 locking element
18 door
19 spindle
20 spindle
21 opening
22 opening
23 corner casting
23a inner surface
24 plate
25 plate
26 openings
27 corner casting
27a inner side
a spaced interval
b width
c width
d spaced interval
e spaced interval
F direction of travel
f width

The invention claimed is:

1. Apparatus for securing a container on a transport vehicle, the apparatus comprising:
a lifting platform supported on the transport vehicle, the lifting platform having a surface configured to support the container;
a plurality of spindles disposed in a longitudinal direction of the platform and positioned generally parallel with and below the surface of the platform;
a plurality of securing elements supported on the platform, said securing elements configured to selectively lie against the container to secure the container at the lifting platform, said securing elements supported on respective ones of said spindles and adapted to pivot between an operating position, a non-operative position, and a passive position,
said plurality of securing elements comprising two-armed levers each having a securing part and a weight part, each of the securing elements supported at one of the spindles at a portion of the respective securing element between the securing part and the weight part;
wherein a multiplicity of the securing elements are divided into first and second groups and are disposed so as to be moveable on the platform such that depending upon the position and type of the container set down on the platform, the first group of the multiplicity of securing elements is moved by the container to the passive position and the second group of the multiplicity of securing elements is permitted by the container to move to the operating position or remains in the operating position so that the second group of securing elements secures the container to prevent it from sliding down off the platform; and
wherein the multiplicity of the securing elements are pivotable in the passive position by an undersurface of the container so that portions of the securing elements are substantially flush with the surface of the platform.

2. The apparatus as claimed in claim 1, wherein the weight parts are dimensioned in such a manner that in a non-operative position of the securing elements, in which no container is set down on the platform, a part of each of the securing elements protrudes from the surface of the platform in a direction of a container to be set down thereon.

3. The apparatus as claimed in claim 1, wherein the securing elements are formed as lateral securing elements and longitudinal securing elements, in their operating position the longitudinal securing elements come to lie against an end side of a container which has slipped in the longitudinal direction of the platform, and in their operating position the lateral securing elements come to lie against an inner side of a corner casting of a container which has slipped transversely with respect to the longitudinal direction of the platform.

4. The apparatus as claimed in claim 3, wherein each of the longitudinal securing elements is formed in the manner of a sheet metal strip shaped with a point at an end of its securing part.

5. The apparatus as claimed in claim 3, wherein the lateral securing elements are formed in the manner of a strip and comprise on an end remote from the respective spindle an edge which in the operating position of the lateral securing elements protrudes in a lateral manner slightly from the platform and at a height of the surface of the platform.

6. The apparatus as claimed in claim 5, wherein in the direction of each spindle, the respective securing part has a parallelogram-like shape, having a longitudinal side facing a container to be set down and an end side remote from the spindle which taper towards one another in an obtuse-angled manner and form the edge.

7. The apparatus as claimed in claim 3, wherein the lateral securing elements are distributed in several groups on the platform such that containers of various sizes can be secured in each case in a region of corner castings thereof.

8. The apparatus as claimed in claim 3, wherein the lateral securing elements are disposed in a redundant manner as a pair in relation to a corner casting which is to be secured.

9. The apparatus as claimed in claim 3, wherein the longitudinal securing elements are distributed in several groups on the platform such that containers of various sizes can be secured in each case in a region of end sides thereof.

10. The apparatus as claimed in claim 3, further comprising rigid end securing elements disposed in a region of an end surface of the platform.

11. The apparatus as claimed in claim 1, wherein the platform is divided in its longitudinal direction into two platforms and the securing elements are disposed in a mirror-inverted manner with respect to each other on respective ones of the two platforms.

12. The apparatus as claimed in claim 1, wherein a width of the platform is smaller than a width of the container.

13. The apparatus as claimed in claim 2, wherein the securing elements are formed as lateral securing elements and longitudinal securing elements, in their operating position the longitudinal securing elements come to lie against an end side of a container which has slipped in the longitudinal direction of the platform, and in their operating position the lateral securing elements come to lie against an inner side of a corner casting of a container which has slipped transversely with respect to the longitudinal direction of the platform.

14. The apparatus as claimed in claim 13, wherein each of the longitudinal securing elements is formed in the manner of a sheet metal strip shaped with a point at an end of its securing part.

15. The apparatus as claimed in claim 13, wherein the lateral securing elements are formed in the manner of a strip and comprise on an end remote from the respective spindle an edge which in the operating position of the lateral securing elements protrudes in a lateral manner slightly from the platform and at a height of the surface of the platform.

16. The apparatus as claimed in claim 4, wherein the lateral securing elements are distributed in several groups on the platform such that containers of various sizes can be secured in each case in a region of their corner castings thereof.

17. The apparatus as claimed in claim 6, wherein the lateral securing elements are distributed in groups on the platform such that containers of various sizes can be secured in each case in a region of their corner castings thereof.

18. The apparatus as claimed in claim 6, wherein the lateral securing elements are distributed in several groups on the platform such that containers of various sizes can be secured in each case in a region of their corner castings thereof.

19. The apparatus as claimed in claim 18, wherein the lateral securing elements are disposed in a redundant manner as a pair in relation to a corner casting which is to be secured.

20. The apparatus as claimed in claim 19, wherein the longitudinal securing elements are distributed in several groups on the platform such that containers of various sizes can be secured in each case in a region of their end sides thereof.

21. The apparatus as claimed in claim 20, further comprising rigid end securing elements disposed in a region of an end surface of the platform.

22. The apparatus as claimed in claim 21, wherein the platform is divided in its longitudinal direction into two platforms and the securing elements are disposed in a mirror-inverted manner with respect to each other on a respective one of the platforms.

23. The apparatus as claimed in claim 22, wherein a width of the platform is smaller than a width of a secured container.

* * * * *

UNITED STATES PATENT AND TRADEMARK OFFICE
CERTIFICATE OF CORRECTION

PATENT NO. : 8,157,492 B2  Page 1 of 1
APPLICATION NO. : 12/673927
DATED : April 17, 2012
INVENTOR(S) : Franzen It is certified that error appears in the above-identified patent and that said Letters Patent is hereby corrected as shown below:

In the Specification

Column 7
Lines 58-59, "in a minor-inverted manner" should be --in a mirror-inverted manner--

Column 8
Lines 27-28, "in a minor-inverted manner" should be --in a mirror-inverted manner--

In the Claims

Column 14
Line 10, Claim 16, "a region of their corner castings" should be --a region of corner castings thereof--
Line 14, Claim 17, "a region of their corner castings" should be --a region of corner castings thereof--
Line 18, Claim 18, "a region of their corner castings" should be --a region of corner castings thereof--
Lines 25-26, Claim 20, "a region of their end sides thereof" should be --a region of end sides thereof--

Signed and Sealed this
Sixteenth Day of September, 2014

Michelle K. Lee
*Deputy Director of the United States Patent and Trademark Office*